US012632649B2

(12) United States Patent
Ferenczi

(10) Patent No.: US 12,632,649 B2
(45) Date of Patent: May 19, 2026

(54) MUTUAL PRIVACY-PRESERVING TRANSFER OF INFORMATION

(71) Applicant: American Express Travel Related Services Company, Inc., New York, NY (US)

(72) Inventor: Andras L. Ferenczi, Scottsdale, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 260 days.

(21) Appl. No.: 18/375,796

(22) Filed: Oct. 2, 2023

(65) Prior Publication Data

US 2025/0111142 A1 Apr. 3, 2025

(51) Int. Cl.
*G06F 40/20* (2020.01)
*G06F 21/60* (2013.01)

(52) U.S. Cl.
CPC ............ *G06F 40/20* (2020.01); *G06F 21/602* (2013.01)

(58) Field of Classification Search
CPC .............................. G06F 40/20; G06F 21/602
See application file for complete search history.

(56) References Cited

U.S. PATENT DOCUMENTS

| | | | | |
|---|---|---|---|---|
| 10,691,754 | B1* | 6/2020 | El Defrawy | ........ H04L 63/0428 |
| 11,328,087 | B1* | 5/2022 | Allen | .................... G06F 21/602 |
| 2017/0147835 | A1* | 5/2017 | Bacon | ..................... H04L 9/321 |
| 2020/0259800 | A1* | 8/2020 | Masny | ............... H04L 63/0428 |
| 2024/0143916 | A1* | 5/2024 | Lee | ......................... G10L 15/22 |
| 2024/0338232 | A1* | 10/2024 | Copes | .................... G06F 9/451 |

* cited by examiner

*Primary Examiner* — Javier O Guzman
(74) *Attorney, Agent, or Firm* — Thomas I Horstemeyer, LLP

(57) ABSTRACT

Disclosed are various embodiments for a mutual privacy-preserving transfer of information using natural language and oblivious transfer (OT) protocols. A receiver entity can send a response request with prompts and corresponding keys to a sender entity. The sender entity can generate the responses using an output of large language models. Before sending the responses to the receiver entity, the sender entity encrypts the responses. The receiver entity can only decrypt the response that is encrypted using the public key associated with the receiver entity.

19 Claims, 6 Drawing Sheets

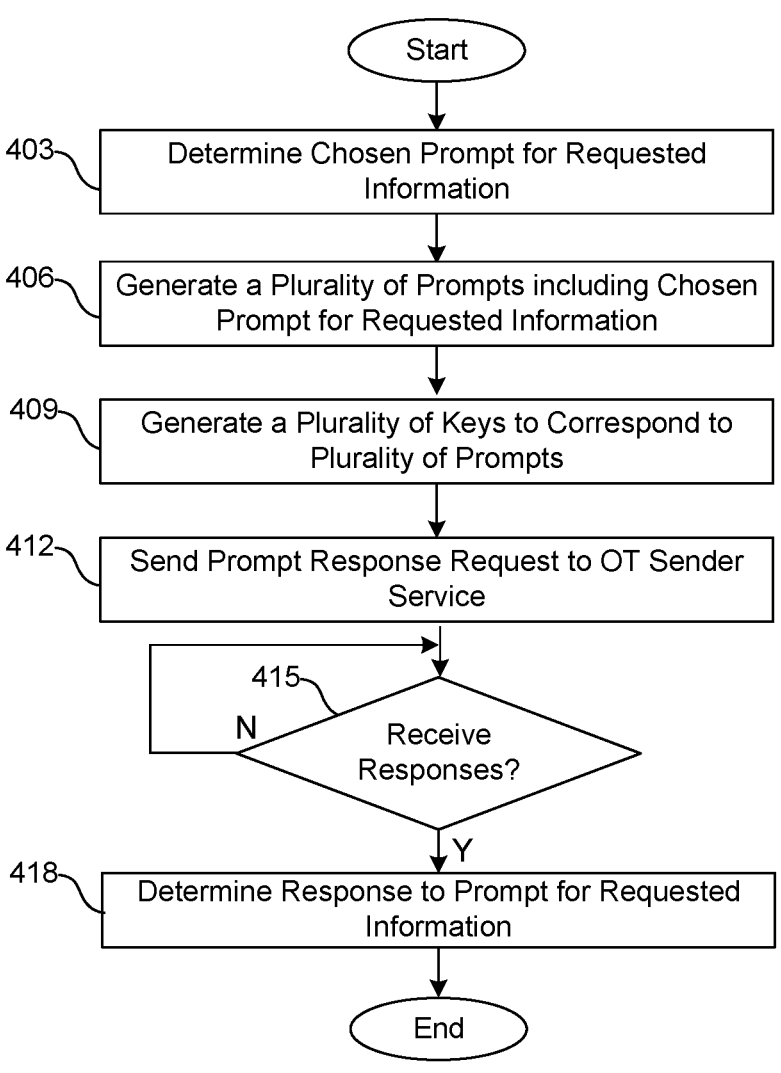
403 — Determine Chosen Prompt for Requested Information
406 — Generate a Plurality of Prompts including Chosen Prompt for Requested Information
409 — Generate a Plurality of Keys to Correspond to Plurality of Prompts
412 — Send Prompt Response Request to OT Sender Service
415 — Receive Responses?
418 — Determine Response to Prompt for Requested Information
FIG. 4
218

Start

503 — Receive Response Request for a Plurality of Prompts

506 — Extract Keys and Prompts from Response Request

509 — Invoke Automous Agent to Obtain Prompt Responses

512 — Receive Prompt Responses

515 — Encrypt Prompt Responses Using Corresponding Keys

518 — Transmit Encrypted Responses to Receiver Computing Device

End

212

MUTUAL PRIVACY-PRESERVING TRANSFER OF INFORMATION

BACKGROUND

Secure communication corresponds to the exchange of information between parties where one or both of the parties are protected from unauthorized access. In some instances, one party may not want the other party to have knowledge of the information being obtained. Communication via oblivious transfer allows a receiver entity to securely obtain information from a sender entity without the sender entity knowing what information the receiver entity is interested in accessing. In addition, the receiver entity is only able to access the information it is interested in without access to additional information.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 4-6 are flowcharts illustrating examples of functionality implemented as portions of applications executed in computing environments in the network environment of FIG. 2 according to various embodiments of the present disclosure.

DETAILED DESCRIPTION

Disclosed are various approaches for the mutual privacy-preserving transfer of information using natural language and oblivious transfer (OT) protocols. Using the principals of oblivious transfer, entity A (e.g., a receiver) can securely obtain information from entity B (e.g., a sender) without the entity B knowing what information entity A is interested in accessing. In addition, entity A is only able to access the information it is interested in without access to additional information. According to various examples of the present disclosure, natural language and large language models (LLMs) can be used to securely exchange requests and responses between entities based on oblivious transfer.

Oblivious transfer (OT) is a cryptographic communication protocol that allows for the secure exchange of information between two entities that may be mutually distrustful of one another. For example, a receiver entity may wish to receive information from a sender entity without the sender entity having knowledge of the information the receiver entity would like to receive from the sender entity. Conversely, the sender may be able to provide the information with additional information such that the receiver is only able to access the requested information.

In one example, an issuer entity (e.g., credit card company) associated with a home improvement company may be interested in offering a new product to incentivize home improvement purchases to individuals having a certain score range that that have recently purchased a home and don't currently have a transaction account issued by the issuer entity. Using the examples of the present disclosure, the issuer entity (e.g., the receiver) can request to obtain user information held by a consumer reporting company (e.g., the sender) without the consumer reporting company knowing the intention of the issuer entity. Similarly, the issuer entity is only able to access the information it is interested in and no additional information. In various examples, users can provide consent for the consumer reporting company to share their information in exchange for money, product offerings, or other items.

Figure 1:
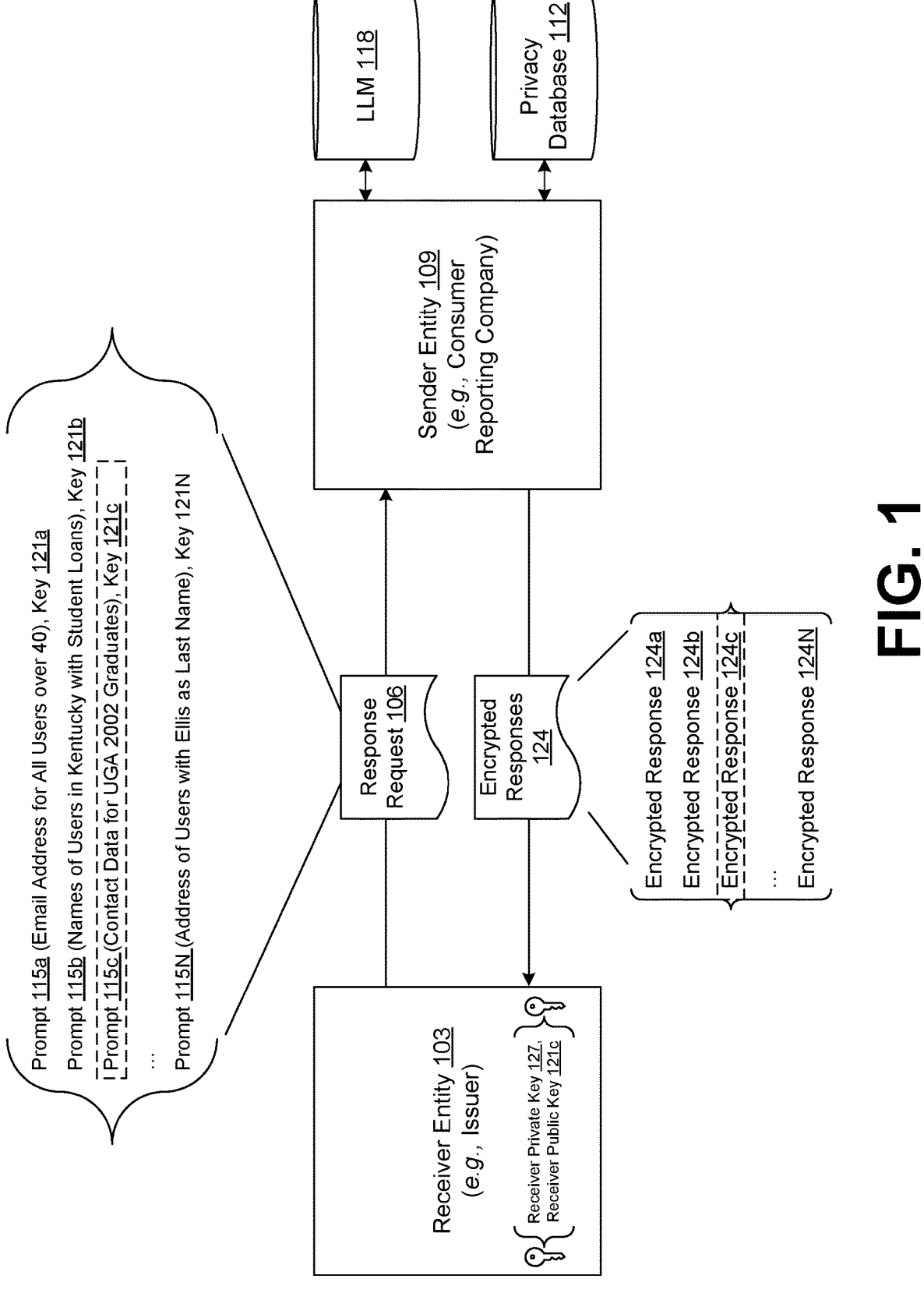
FIG. 1 is a drawing depicting one of several embodiments of the present disclosure.

As illustrated in FIG. 1, shown is an example scenario where information is securely exchanged between two parties using natural language and the principals of oblivious transfer. In FIG. 1, a receiver entity 103 sends a response request 106 to a sender entity 109 using natural language and the principals of oblivious transfer. In this example, the receiver entity 103 is wanting information that is accessible through the sender entity 109 via a privacy database 112. In this example, the receiver entity 103 can comprise an issuer (e.g., a credit card company) and the sender entity 109 can comprise a consumer reporting company (e.g., a credit bureau).

The information wanted by the receiver entity 103 can be provided to the sender entity 109 in the form of a prompt 115 that is included in a response request 106. A prompt 115 can correspond to a query or text that can be used to request information from another system or service. In various examples, the prompt 115 can be in a natural language format and can be used as an input to a large language model 118 that is trained to output a response based at least in part on the prompt 115. In various examples, the prompt 115 can be user-defined in response to one or more interactions with a user or voice interface. In this example, a user can provide the prompt 115 in written or voice form. In other examples, the prompt 115 can be dynamically generated based at least in part on context, user-defined parameters, and/or other data.

In various examples, the response request 106 can include a plurality of prompts 115 (e.g., 115a, 115b, 115c, . . . 115N) where only one of the prompts 115 corresponds to the information wanted by the receiver entity 103. In the example of FIG. 1, prompt 115c (e.g., Contact Data for UGA 2002 graduates) can correspond to the information wanted by the receiver entity 103 and the remaining prompts 115 can correspond to randomly generated or otherwise non-relevant prompts 115. By providing multiple prompts 115 to the sender entity 109, the sender entity 109 remains unaware of what information the receiver entity 103 has chosen to receive.

In various examples, the response request 106 can further include a plurality of corresponding keys 121 (e.g., 121a, 121b, 121c, . . . 121N) that can be used by the sender entity 109 to generate encrypted responses 124 (e.g., 124a, 124b, 124c, . . . 124N). The key 121c corresponding to the chosen prompt 115c of the receiver entity 103 can comprise a public key of a cryptographic key-pair associated with the receiver entity 103. In this example, the receiver entity 103 has control of the private key 127 of the cryptographic key-pair that can be used to decrypt the encrypted response 124 that is encrypted using the public key 121 of the cryptographic key-pair. The remaining keys 121 can be randomly generated keys 121 that do not have a corresponding private key 127 and are included in the response request 106 to correspond to the remaining prompts 115. Accordingly, the receiver entity 103 is unable to decrypt the remaining encrypted responses 124 and, therefore, is only able to access the information associated with the chosen prompt 115.

In various examples, the information needed to respond to a given prompt 115 can be stored in a privacy database 112 or other type of database that is accessible by the sender entity 109. In some examples, the natural language format of the prompt 115 can be incompatible with the format required to access the data included in the privacy database 112. Accordingly, in some examples, upon receiving the response request 106 from the receiver entity 103, including the multiple prompts 115 and corresponding keys 121, the sender entity 109 can submit the prompts 115 as inputs to a LLM 118 with a request to format each of the prompts 115 into a format that is compatible for accessing the required data from the privacy database 112. Accordingly, the output of the LLM 118 can include a plurality of reformatted prompts that can be applied to access the required data from the privacy database 112.

In some examples, the output of the LLM 118 comprises executable code that can be used to access the data in the privacy database 112. In various examples, the executable code can comprise structured query language (SQL), python, Java, PHP, and/or other type of executable code that can access data from the privacy database 112. For example, the LLM 118 can convert each prompt 115 included in the response request 106 into executable code that is compatible with the privacy database 112.

In various examples, the sender entity 109 can execute the executable code that is output from the LLM 118 to obtain the data from the privacy database 112 to respond to the prompts 115 included in the response request 106. The data obtained from the privacy database 112 can then be used as inputs to the LLM 118 along with response formatting rules that define how to generate the responses to each of the prompts 115 based at least in part on the received data from the privacy database 112. Accordingly, the output of the LLM 118 can correspond to responses to each of the original prompts 115 from the response request 106. In various examples, the responses can be in a natural language format and/or other format as defined by the response formatting rules.

Using the corresponding keys 121 included in the response request 106, the sender entity 109 can generate encrypted responses 124 by encrypting each of the responses included in the output of the LLM 118. Using the example of FIG. 1, encrypted response 124*a* includes the response to prompt 115 that is encrypted using the key 121*a*. Similarly, encrypted response 124*c* includes the response to prompt 115*c* (e.g., the receiver's chosen prompt) and is encrypted using key 121*c* which is the public key 121*c* to the private key 127 owned by the receiver entity 103. The sender entity 109 can transmit the encrypted responses 124 to the receiver entity 103 in accordance with an oblivious transfer protocol. The receiver entity 103 can decrypt the encrypted responses 124*c* that correspond to the chosen prompt 115*c* using the private key 127 to the public key 121*c* that was used to encrypt the chosen prompts 115*c*.

According to various examples, the receiver entity 103 can use the information included in the response to provide offers, products, or otherwise incentivize the users associated with the obtained data. In some examples, users having information stored in the privacy database 112 can register to participate in an information sharing service for obtaining offers or other types of incentives in an exchange for information that may be considered private. For example, a user can provide consent to allow the sender entity 109 to provide certain user privacy data to a receiver entity 103 in exchange for incentives provided by the receiver entity 103. In some examples, users can define what type of data can be shared by the sender entity 109, what types of receiver entities 103 can obtain the data, and/or other types of parameters to allow the user control over what information is shared.

Figure 2:
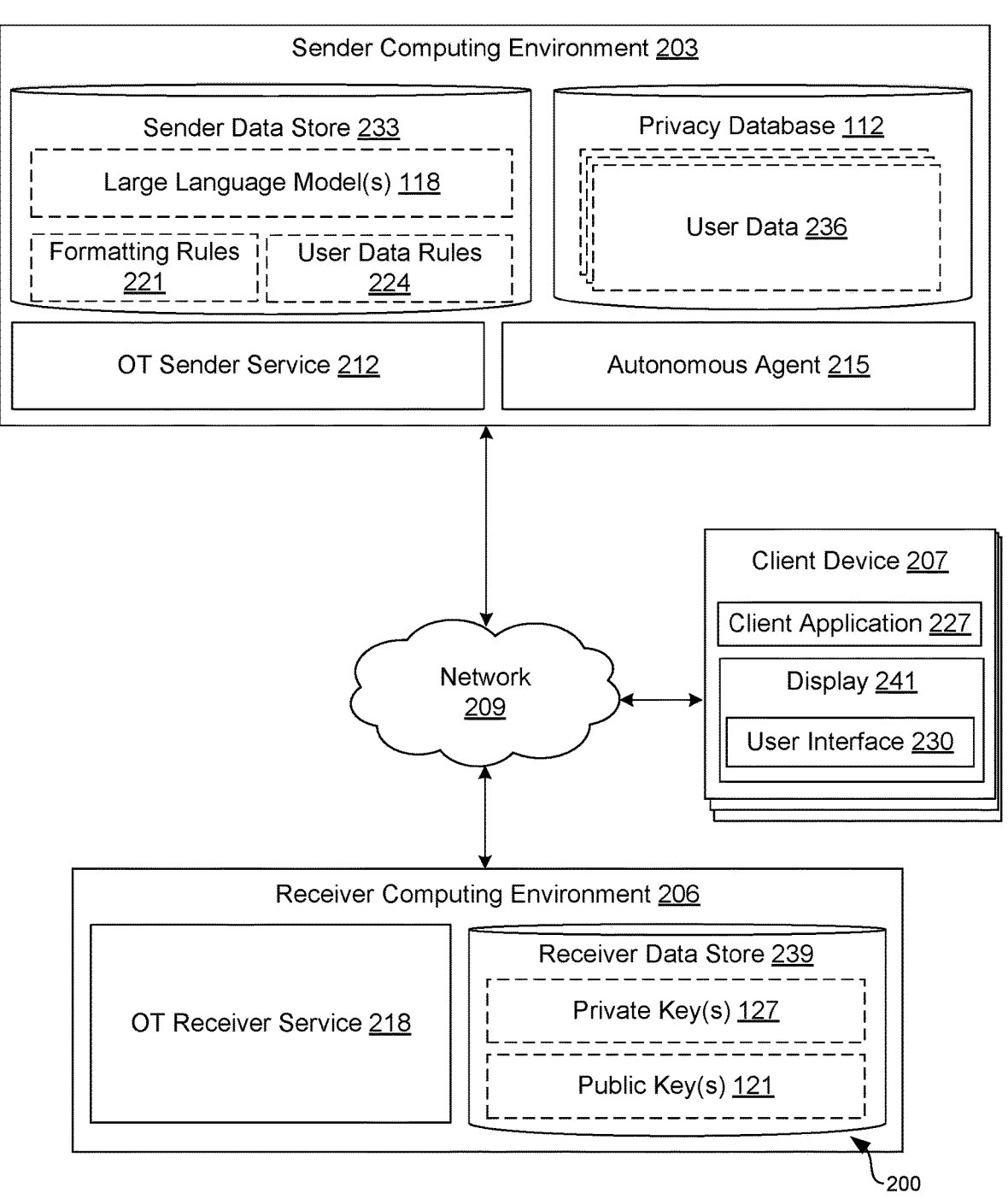
FIG. 2 is a drawing of a network environment according to various embodiments of the present disclosure.

With reference to FIG. 2, shown is a network environment 200 according to various embodiments. The network environment 200 can include a sender computing environment 203, a receiver computing environment 206, and a client device 207 which can be in data communication with each other via a network 209. In various examples, the sender computing environment 203 can correspond to a sender entity 109 (FIG. 1) that has access to information wanted by a receiver entity 103 (FIG. 1). Likewise, the receiver computing environment 206 can correspond to the receiver entity 103 wanting to obtain information from a sender entity 109.

The network 209 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 209 can also include a combination of two or more networks 209. Examples of networks 209 can include the Internet, intranets, extranets, virtual private networks (VPNs), and similar networks.

The sender computing environment 203 and the receiver computing environment 206 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the sender computing environment 203 and the receiver computing environment 206 can each employ a plurality of computing devices that can be arranged in one or more server banks or computer banks or other arrangements. Such computing devices can be located in a single installation or can be distributed among many different geographical locations. For example, the sender computing environment 203 and the receiver computing environment 206 can each include a plurality of computing devices that together can include a hosted computing resource, a grid computing resource, or any other distributed computing arrangement. In some cases, sender computing environment 203 and the receiver computing environment 206 can each correspond to an elastic computing resource where the allotted capacity of processing, network, storage, or other computing-related resources can vary over time.

Various applications or other functionality can be executed in the sender computing environment 203. The components executed on the sender computing environment 203 include an oblivious transfer (OT) sender service 212, an autonomous agent 215, and other applications, services, processes, systems, engines, or functionality not discussed in detail herein.

The OT sender service 212 can be executed to interact with an OT receiver service 218 in the receiver computing environment 206 to obtain response requests 106 comprising prompts 115 and keys 121 and facilitate the generation of responses to the prompts 115. In various examples, the OT sender service 212 can obtain a response request 106 from a receiver service 218 via oblivious transfer communication protocols. An oblivious transfer protocol can include, for example, a naor-pinkas protocol, OT extension protocol, OT with paillier cryptosystem protocol, a multiplicative homomorphic cryptosystem-based OT protocol, and/or other type of oblivious transfer protocol. In some examples, the OT sender service 212 is invoked via an application programming interface (API) call from the receiver service 218 where the response request 106 is an input to the API call.

In various examples, the OT sender service 212 can extract each of the prompts 115 and each of the corresponding keys 121 included in the response request 106. The OT sender service 212 can invoke an autonomous agent 215 to obtain the responses for each of the prompts 115. In some examples, the OT sender service 212 can provide the autonomous agent 215 with formatting rules 221, user data rules 224, and/or other types of rules that define how the prompt responses are to be provided and/or formatted.

Upon receiving the prompt responses to each of the prompts 115 from the autonomous agent 215, the OT sender service 212 can generate encrypted responses 124 by encrypting each of the prompt responses received using the corresponding key 121 included in the response request 106. Using the example of FIG. 1, encrypted response 124a comprises the response to prompt 115 that is encrypted using the key 121a. Similarly, encrypted response 124c comprises the response to prompt 115c and is encrypted using key 121c.

In various examples, the OT sender service 212 can transmit the encrypted responses 124 to the OT receiver service 218 in accordance with an oblivious transfer protocol. The OT sender service 212 remains unaware of which encrypted response 124 (and corresponding prompt 115) is of interest to the receiver entity 103 since the OT sender service 212 is not privy to which key 121 corresponds to the public key 121 associated with the private key 127 controlled by the receiver entity 103. Likewise, the OT receiver service 218 can decrypt only the encrypted response 124 that corresponds to the chosen prompt 115 using the private key 127 to the public key 121 that was used to encrypt the chosen prompt 115.

In various example, the OT sender service 212 can be executed to interact with a client application 227 of a client device 207 associated a user to register the user with an information sharing service associated with the OT sender service 212. In this example, a user can register with the information sharing service associated with the OT sender service 212 and provide consent to allow the OT sender service 212 to provide certain user privacy data to an OT receiver service 218 in exchange for incentives provided by the receiver entity 103. In some examples, users can interact with one or more user interfaces 230 associated with the OT sender service 212 to define what type of data can be shared by the OT sender service 212, what types of receiver entities 103 can obtain the data, and/or other types of parameters to allow the user control over what information is shared. The OT sender service 212 can generate user data rules 224 based at least in part on the user inputs and registration data. The user data rules 224 can then be used by the OT sender service, autonomous agent 215, and/or LLM 118 to ensure that the information included in a given response to a prompt 115 complies with the user's consent.

The autonomous agent 215 can be executed to receive prompts 115 from an OT sender service 212 requesting responses to the prompts 115. In various examples, the autonomous agent 215 can reformat the prompts 115 into a format that is compatible with the privacy database 112 or other database that includes data required to respond to the prompts 115. For example, the autonomous agent 215 can execute an LLM 118 and submit the prompts 115 as inputs to a LLM 118 with a request to format each of the prompts 115 into a format that is compatible for accessing the required data from the privacy database 112 or other database. Accordingly, the output of the LLM 118 can include a plurality of reformatted prompts 115 that can be applied to access the required data from the privacy database 112.

In some examples, the output of the LLM 118 (e.g., the reformatted prompts 115) comprises executable code that can be used to access the data in the privacy database 112. In various examples, the executable code can comprise structured query language (SQL), python, Java, PHP, and/or other type of executable code that can access data from the privacy database 112. For example, the autonomous agent 215, via the LLM 118, can convert each prompt 115 included in the response request 106 into executable code that is compatible with the privacy database 112.

In various examples, the autonomous agent 215 can further be executed to execute the executable code that is output from the LLM 118 to obtain the data from the privacy database 112 to respond to the prompts 115 included in the response request 106. The autonomous agent can execute the LLM 118 and apply the data obtained from the privacy database 112 as inputs to the LLM 118 along with response formatting rules 221 that define how to generate the responses to each of the prompts 115 based at least in part on the received data from the privacy database 112, user data rules 224, and/or other type of input that can be used to format. Accordingly, the output of the LLM 118 can correspond to responses to each of the original prompts 115 from the response request 106. In various examples, the responses can be in a natural language format and/or other format as defined by the response formatting rules 221.

It should be noted that although the autonomous agent 215 is illustrated in FIG. 1 as being located in the sender computing environment 203 associated with the OT sender service 212, in some examples, the autonomous agent 215 can be executed in another cloud-based computing environment such as, for example, Amazon Web Services® (AWS®), Azure®, Google Cloud Platform® (GCP®) and/or other type of cloud platform. In some examples, at least a portion of the functionality of the autonomous agent 215 can be performed by the OT sender service 212. In other examples, at least a portion of the functionality of the OT sender service 212 can be performed by the autonomous agent 215.

Also, various data is stored in a sender data store 233 and a privacy database 112 that are accessible to the sender computing environment 203. The sender data store 233 and the privacy database 112 can each be representative of a plurality of data stores, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the sender data store 233 is associated with the operation of the various applications or functional entities described below. This data can include a large language model 118, formatting rules 221, user data rules 224, and potentially other data.

A large language model 118 can represent any language model that includes a neural network with many parameters (tens of thousands, millions, or sometimes even billions or more) that is trained on large quantities of unlabeled text using self-supervised learning or semi-supervised learning techniques. Some large language models 118 may be generative—that is they can generate new data based at least in part on patterns and structure learned from their input training data. Examples of large language models 118 include various versions of OPENAI's Generative Pre-trained Transformer (GPT) model (e.g., GPT-1, GPT-2, GPT-3, GPT-4, etc.), META's Large Language Model Meta AI (LLaMA), and GOOGLE's Pathways Language Model 2 (PaLM 2), among others. A large language model 118 can be configured to return a response to a prompt, which can be in a structured form (e.g., a request or prompt with a predefined schema and/or parameters) or in an unstructured form (e.g., free form or unstructured text).

In various examples, the LLM 118 of the present disclosure can be trained to reformat the each of the prompts 115 into a format that is compatible for accessing the required data from the privacy database 112 or other database. Accordingly, the output of the LLM 118 can include a plurality of reformatted prompts 115 that can be applied to access the required data from the privacy database 112. In some examples, the output of the LLM 118 (e.g., the reformatted prompts 115) comprises executable code that can be used to access the data in the privacy database 112. In various examples, the executable code can comprise structured query language (SQL), python, Java, PHP, and/or other type of executable code that can access data from the privacy database 112.

In various examples, the LLM 118 can be further trained to generate responses to the prompts 115 using the data obtained from the privacy database 112 as inputs to the LLM 118 along with response formatting rules 221 that define how to generate the responses to each of the prompts 115 based at least in part on the received data from the privacy database 112, user data rules 224, and/or other type of input that can be used to format. Accordingly, the output of the LLM 118 can correspond to responses to each of the original prompts 115 from the response request 106 using the data obtained from the privacy database 112. In various examples, the responses can be in a natural language format and/or other format as defined by the response formatting rules 221.

The formatting rules 221 can include rules, models, and/or configuration data for the various algorithms or approaches employed by the OT sender service 212, autonomous agent 215, or LLM 118 in defining the format of an output of a LLM 118. For example, the formatting rules 221 can define the different types of formats that are compatible for accessing data from the privacy database 112 or other database. As such, when applied as an input to an LLM 118 along with prompts 115 included in the response request 106, the LLM 118 can use the formatting rules 221 to reformat the prompts 115 into the format compatible with the privacy database 112. In some examples, the formatting rules 221 can further include rules that define the parameters and configuration of the responses that are output from the LLM 118 response to the prompts 115 and obtained data from the privacy database 112. In this example, the formatting rules 221 can define an order of placement for each of the responses, a language format for each of the responses (e.g., natural language, CSV, etc.) to prompts 115 that are determined using the obtained data from the privacy database 112 or other database, and/or other parameter for ensuring that the responses formatted appropriately for providing to the OT receiver service 218.

The user data rules 224 can include rules, models, and/or configuration data for the various algorithms or approaches employed by the OT sender service 212, autonomous agent 215, or LLM 118 in defining what information a user has permitted to be shared. In some examples, users can interact with one or more user interfaces 230 associated with the OT sender service 212 to define what type of data can be shared by the OT sender service 212, what types of receiver entities 103 can obtain the data, and/or other types of parameters to allow the user control over what information is shared. The user data rules 224 can be based at least in part on the user inputs and registration data. The user data rules 224 can be used by the OT sender service, autonomous agent 215, and/or LLM 118 to ensure that the information included in a given response to a prompt 115 complies with the user's consent.

The data stored in the privacy database 112 can include user data 236, and potentially other data. The user data 236 corresponds to data associated with a given user or entity and can include, for example, personally identifiable information, financial information, payment information, health data, contact data (e.g., address, telephone, email address, etc.), employer data, birthdate data, family history data, credit device data, user interaction data, user preference data, and/or any other type of data that can be associated with the given user or entity. The user data 236 can include private data, public data, and/or both private and public data.

In some examples, the privacy database 112 can be managed and controlled by an entity that is separate from the sender entity 109. It should be noted that although the privacy database 112 is illustrated as being included in the sender computing environment 203, in some examples, the privacy database 112 is associated with a third-party entity that is accessible to the sender computing environment 203 via interactions across the network 209. For example, the sender entity 109 can correspond to an entity that has access to the privacy database 112 as a result of an agreement with or relationship with the entity that manages or controls the privacy database 112.

Various applications or other functionality can be executed in the receiver computing environment 206. The components executed on the receiver computing environment 206 include the OT receiver service 218, and other applications, services, processes, systems, engines, or functionality not discussed in detail herein.

The OT receiver service 218 can be executed to determine a response to information wanted by a user or receiver entity 103 associated with the OT receiver service 218. For example, a user can provide a prompt 115 (e.g., a chosen prompt) that corresponds to information wanted by the user. A prompt 115 can correspond to a query or text that can be used to request information from another system or service. In various examples, the prompt 115 can be in a natural language format and can be used as an input to a large language model 118 that is trained to output a response based at least in part on the prompt 115. In various examples, the prompt 115 can be user-defined in response to one or more interactions with a user or voice interface. In this example, a user can provide the prompt 115 in written or voice form. In other examples, the prompt 115 can be dynamically generated based at least in part on context, user-defined parameters, and/or other data.

In response to determining the prompt 115 of the user or receiver entity 103, the OT receiver service 218 can send a response request 106 to the OT sender service 212 using oblivious transfer. An oblivious transfer protocol can include, for example, a naor-pinkas protocol, OT extension protocol, OT with paillier cryptosystem protocol, a multiplicative homomorphic cryptosystem-based OT protocol, and/or other type of oblivious transfer protocol. In various examples, the OT receiver service 218 can be further executed to generate the response request 106 to send to the OT sender service 212. The response request 106 can be generated to include multiple prompts 115 and corresponding keys 121. In various examples, the response request 106 can include multiple prompts 115 where only one of the prompts 115 (e.g., the chosen prompt) corresponds to the information wanted by the receiver entity 103 or user. The remaining prompts 115 can correspond to randomly generated or otherwise non-relevant prompts 115 that are generated by the OT receiver service 218. By providing multiple prompts 115 to the OT sender service 212, the sender entity 109 associated with the OT sender service 212 remains unaware of what information the receiver entity 103 associated with the OT receiver service 218 has chosen to receive.

In various examples, the key 121 corresponding to the chosen prompt 115 of the receiver entity 103 can comprise a public key 121 of a cryptographic key-pair associated with the receiver entity 103. In this example, the receiver entity 103 has control of the private key 127 of the cryptographic key-pair that can be used to decrypt the encrypted response 124 that is encrypted using the public key 121 of the cryptographic key-pair. The OT receiver service 218 can be further executed to generate the remaining keys 121 to correspond to the other prompts 115 included in the response request 106. In various examples, the OT receiver service 218 can generate the remaining keys 121 using key generation algorithms. In some examples, the remaining keys 121 can be generated to not have a corresponding private key 127 and are included in the response request 106 to correspond to the remaining prompts 115. Accordingly, the receiver entity 103 is unable to decrypt the remaining encrypted responses 124 due to the lack of a corresponding private key 127 and, therefore, is only able to access the information associated with the chosen prompt 115.

In various examples, the OT receiver service 218 can generate the response request 106 in a format that is compatible with a given oblivious transfer protocol. In various examples, the OT receiver service 218 can initiate an oblivious transfer communication by sending the response request 106 to the OT sender service 212. In some examples, the response request 106 is transmitted to the OT sender service 212 via an API call or other form of request in compliance with the oblivious transfer protocol.

The OT receiver service 218 can be further executed to receive encrypted responses 124 from the sender entity 109 via the OT sender service 212. In response to receiving the encrypted responses, the OT receiver service 218 can decrypt the encrypted response 124 associated with the chosen prompt 115 by using the private key 127 to the public key 121 used to encrypt the encrypted response 124. As each encrypted response 124 is encrypted using a different key 121 included in the response request 106, the OT receiver service 218 can only decrypt the encrypted response 124 that was encrypted using the public key 121 corresponding to the chosen prompt 115. In response to decrypting the response, the OT receiver service 218 can use the information obtained as desired. For example, the OT receiver service 218 can include the information in a user interface 230 that can be rendered on a client device 207. In some examples, the OT receiver service 218 can generate incentives or offers to users associated with the obtained information. As such, the OT receiver service 218 can generate an incentive or offer and transmit the incentive or offer to the users via contact data include in the decrypted response.

Also, various data is stored in a receiver data store 239 that is accessible to the receiver computing environment 206. The receiver data store 239 can be representative of a plurality of data stores 239, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the receiver data store 239 is associated with the operation of the various applications or functional entities described below. This data can include a private key 127, a public key 121, and potentially other data.

The public key 121 and the private key 127 can correspond to a public-private key pair controlled by a receiver entity 103 associated with the OT receiver service 218 and the receiver computing environment 206. The key-pair can be generated using various approaches, such as elliptic curve cryptography (ECC) approaches or using approaches based at least in part on the Rivest-Shamir-Adleman (RSA) algorithm. In various examples, the public key 121 can be transmitted to an OT sender service 212 as a corresponding key 121 to a chosen prompt 115 included in a response request 106. The OT sender service 212 can generate an encrypted response 124 to the chosen prompt 115 using the public key 121. The private key 127 remains stored in the receiver data store 239 and can be used to decrypt the encrypted response 124 to the chosen prompt 115 that is received from the OT sender service 212.

The client device 207 is representative of a plurality of client devices that can be coupled to the network 209. The client device 207 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device ###can include one or more displays 241, such as liquid crystal displays (LCDs), gas plasma-based flat panel displays, organic light emitting diode (OLED) displays, electrophoretic ink ("E-ink") displays, projectors, or other types of display devices. In some instances, the display 241 can be a component of the client device 207 or can be connected to the client device 207 through a wired or wireless connection.

The client device 207 can be configured to execute various applications such as a client application 227 or other applications. The client application 227 can be executed in a client device 207 to access network content served up by the sender computing environment 203, the receiver computing environment 206, or other servers, thereby rendering a user interface 230 on the display 241. To this end, the client application 227 can include a browser, a dedicated application, or other executable, and the user interface 230 can include a network page, an application screen, or other user mechanism for obtaining user input. The client device 207 can be configured to execute applications beyond the client application 227 such as email applications, social networking applications, word processors, spreadsheets, or other applications.

Figure 3:
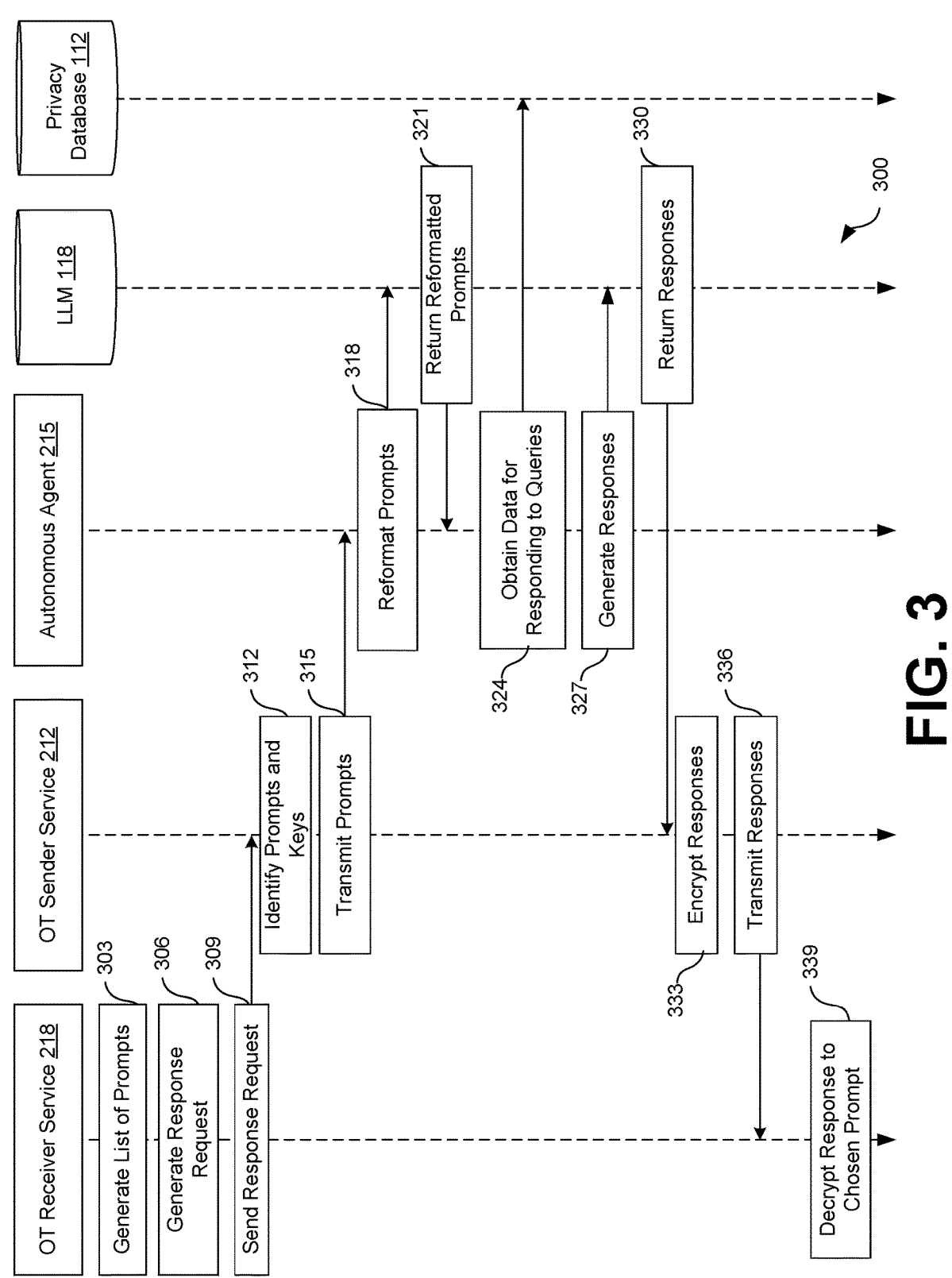
FIG. 3 is a sequence diagram illustrating examples of functionality in the network environment of FIG. 2 according to various embodiments of the present disclosure.

Next, a general description of the operation of the various components of the network environment 200 is provided with reference to FIGS. 3-6. To begin, FIG. 3 illustrates a sequence diagram 300 that provides an example of the operation of the components of the network environment 200. It is understood that the sequence diagram 300 of FIG. 3 provides merely an example of the many different types of functional arrangements that can be employed to implement the operation of the depicted portion of the network environment 200. As an alternative, the sequence diagram 300 of FIG. 3 can be viewed as depicting an example of elements of a method implemented within the network environment 200. In particular, the sequence diagram 300 of FIG. 3 depicts the functionality associated with obtaining a response to a natural language prompt 115 using oblivious transfer and large language models 118.

Beginning with block 303, an OT receiver service 218 generates a list of prompts 115. A prompt 115 can correspond to a query or text that can be used to request information from another system or service. In various examples, the prompt 115 can be in a natural language format and can be used as an input to a large language model 118 that is trained to output a response based at least in part on the prompt 115. In various examples, the list of prompts 115 includes a chosen prompt 115 and other prompts 115. For example, a user or receiver entity 103 can provide a prompt 115 (e.g., a chosen prompt) that corresponds to information wanted by the user or receiver entity 103. In various examples, the prompt 115 can be user-defined in response to one or more interactions with a user or voice interface. In this example, a user or receiver entity 103 can provide the prompt 115 in written or voice form. In other examples, the prompt 115 can be dynamically generated based at least in part on context, user-defined parameters, and/or other data.

In addition to the chosen prompt 115, the list of prompts can include other prompts 115 in accordance with the principles of oblivious transfer. The remaining prompts 115 can correspond to randomly generated or otherwise non-relevant prompts 115 that are generated by the OT receiver service 218. By providing multiple prompts 115 to the OT sender service 212, the sender entity 109 associated with the OT sender service 212 remains unaware of what information the receiver entity 103 associated with the OT receiver service 218 has chosen to receive.

At block 306, the OT receiver service 218 generates a response request 106 comprising the list of prompts 115 and corresponding keys 121. In various examples, the response request 106 can include the prompts 115 from the list of prompts where only one of the prompts 115 corresponds to the information wanted by the receiver entity 103. The keys 121 can be used by a sender entity 109 (e.g., OT sender service 212) to generate encrypted responses 124 to the prompts 115. The key 121 corresponding to the chosen prompt 115 of the receiver entity 103 can comprise a public key of a cryptographic key-pair associated with the receiver entity 103. In this example, the receiver entity 103 has control of the private key 127 of the cryptographic key-pair that can be used to decrypt the encrypted response 124 that is encrypted using the public key 121 of the cryptographic key-pair.

In various examples, the OT receiver service 218 can generate the remaining keys 121 to correspond to the other prompts 115 included in the response request 106. In various examples, the OT receiver service 218 can generate the remaining keys 121 using key generation algorithms. In some examples, the remaining keys 121 can be generated to not have a corresponding private key 127 and are included in the response request 106 to correspond to the remaining prompts 115.

At block 309, the OT receiver service 218 transmits the response request 106 to the OT sender service 212. In various examples, the OT receiver service 218 can initiate an oblivious transfer communication by sending the response request 106 to the OT sender service 212. In some examples, the response request 106 is transmitted to the OT sender service 212 via an API call or other form of request in compliance with the oblivious transfer protocol. An oblivious transfer protocol can include, for example, a naor-pinkas protocol, OT extension protocol, OT with paillier cryptosystem protocol, a multiplicative homomorphic cryptosystem based OT protocol, and/or other type of oblivious transfer protocol.

At block 312, the OT sender service 212 identifies the prompts 115 and keys 121 included in the response request 106. In various examples, the OT sender service 212 can extract each of the prompts 115 and each of the corresponding keys 121 included in the response request 106. In various examples, the prompts 115 and corresponding keys 121 are included in the response request 106 in a format compatible with the OT protocol. As such, the OT sender service 212 can identity the prompts 115 and corresponding keys 121 according to the format of the response request 106.

At block 315, the OT sender service 212 transmits the prompts 115 to the autonomous agent 215. For example, the OT sender service 212 can invoke an autonomous agent 215 to obtain the responses for each of the prompts 115. In some examples, the OT sender service 212 can provide the autonomous agent 215 with formatting rules 221, user data rules 224, and/or other types of rules that define how the prompt responses are to be provided and/or formatted.

At block 318, the autonomous agent 215 can reformat the prompts 115. In various examples, the autonomous agent 215 can reformat the prompts 115 into a format that is compatible with the privacy database 112 or other database that includes data required to respond to the prompts 115. For example, the autonomous agent 215 can execute an LLM 118 and submit the prompts 115 as inputs to a LLM 118 with a request to format each of the prompts 115 into a format that is compatible for accessing the required data from the privacy database 112 or other database.

At block 321, the LLM 118 can provide the reformatted prompts 115 to the autonomous agent 215. The output of the LLM 118 includes the reformatted prompts 115 that can be applied to access the required data from the privacy database 112. In some examples, the output of the LLM 118 (e.g., the reformatted prompts 115) comprises executable code that can be used to access the data in the privacy database 112. In various examples, the executable code can comprise structured query language (SQL), python, Java, PHP, and/or other type of executable code that can access data from the privacy database 112.

At block 324, the autonomous agent 215 obtains data from the privacy database 112 using the reformatted prompts 115. In various examples, the autonomous agent 215 can execute the executable code that is output from the LLM 118 to obtain the data from the privacy database 112 to respond to the prompts 115 included in the response request 106.

At block 327, the autonomous agent 215 generates the responses to the prompts 115. For example, the autonomous agent 215 can execute the LLM 118 and apply the data obtained from the privacy database 112 as inputs to the LLM 118 along with response formatting rules 221 that define how to generate the responses to each of the prompts 115 based at least in part on the received data from the privacy database 112, user data rules 224, and/or other type of input that can be used to format.

At block 330, the LLM 118 provides the responses to the OT sender service 212. In various examples, the output of the LLM 118 can correspond to responses to each of the original prompts 115 from the response request 106 in a format that is compatible with the oblivious transfer protocol and as defined by the response formatting rules 221. Although FIG. 3 illustrates the LLM 118 providing the responses to the OT sender service 212, in some examples, the responses are provided to the OT sender service 212 via the autonomous agent 215.

At block 333, the OT sender service 212 generates the encrypted responses 124 by encrypting the responses output from the LLM 118. For example, upon receiving the prompt responses to each of the prompts 115 from the autonomous agent 215, the OT sender service 212 can generate encrypted responses 124 by encrypting each of the prompt responses received using the corresponding key 121 included in the response request 106. Using the example of FIG. 1, encrypted response 124a comprises the response to prompt 115 that is encrypted using the key 121a. Similarly, encrypted response 124c comprises the response to prompt 115c and is encrypted using key 121c.

At block 336, the OT sender service 212 transmits the encrypted responses 124 to the OT receiver service 218. In various examples, the OT sender service 212 can transmit the encrypted responses 124 to the OT receiver service 218 in accordance with an oblivious transfer protocol. The OT sender service 212 remains unaware of which encrypted response 124 (and corresponding prompt 115) is of interest to the receiver entity 103 since the OT sender service 212 is not privy to which key 121 corresponds to the public key 121 associated with the private key 127 controlled by the receiver entity 103.

At block 339, the OT receiver service 218 decrypts the encrypted response 124 to the chosen prompt 115. For example, the OT receiver service 218 can decrypt the encrypted response 124 associated with the chosen prompt 115 by using the private key 127 to the public key 121 used to encrypt the encrypted response 124. As each encrypted response 124 is encrypted using a different key 121 included in the response request 106, the OT receiver service 218 can only decrypt the encrypted response 124 that was encrypted using the public key 121 corresponding to the chosen prompt 115. In response to decrypting the response, the OT receiver service 218 can use the information obtained as desired. For example, the OT receiver service 218 can include the information in a user interface 230 that can be rendered on a client device 207. In some examples, the OT receiver service 218 can generate incentives or offers to users associated with the obtained information. As such, the OT receiver service 218 can generate an incentive or offer and transmit the incentive or offer to the users via contact data include in the decrypted response. Thereafter, this portion of the process proceeds to completion.

Referring next to FIG. 4, shown is a flowchart that provides one example of the operation of a portion of the OT receiver service 218. The flowchart of FIG. 4 provides merely an example of the many different types of functional arrangements that can be employed to implement the operation of the depicted portion of the OT receiver service 218. As an alternative, the flowchart of FIG. 4 can be viewed as depicting an example of elements of a method implemented within the network environment 200.

Beginning with block 403, the OT receiver service 218 determines a chosen prompt 115. A prompt 115 can correspond to a query or text that can be used to request information from another system or service. In various examples, the prompt 115 can be in a natural language format and can be used as an input to a large language model 118 that is trained to output a response based at least in part on the prompt 115. In various example, the chosen prompt 115 corresponds to a request for information wanted by a user or receiver entity 103. For example, a user or receiver entity 103 can provide a prompt 115 (e.g., a chosen prompt) that corresponds to information wanted by the user or receiver entity 103. In various examples, the prompt 115 can be user-defined in response to one or more interactions with a user or voice interface. In this example, a user or receiver entity 103 can provide the prompt 115 in written or voice form. In other examples, the prompt 115 can be dynamically generated based at least in part on context, user-defined parameters, and/or other data.

At block 406, the OT receiver service 218 generates a plurality of prompts including the chosen prompt 115. In addition to the chosen prompt 115, the plurality of prompts can include randomly generated or otherwise non-relevant prompts 115 that are generated by the OT receiver service 218. By providing multiple prompts 115 to the OT sender service 212, the sender entity 109 associated with the OT sender service 212 remains unaware of what information the receiver entity 103 associated with the OT receiver service 218 has chosen to receive.

At block 409, the OT receiver service 218, generates a plurality of keys 121 to correspond to the plurality of prompts 115. The keys 121 can be used by a sender entity 109 (e.g., OT sender service 212) to generate encrypted responses 124 to the prompts 115. The key 121 corresponding to the chosen prompt 115 of the receiver entity 103 can comprise a public key of a cryptographic key-pair associated with the receiver entity 103. In this example, the receiver entity 103 has control of the private key 127 of the cryptographic key-pair that can be used to decrypt the encrypted response 124 that is encrypted using the public key 121 of the cryptographic key-pair. In various examples, the OT receiver service 218 can generate the remaining keys 121 to correspond to the other prompts 115 included in the response request 106. In various examples, the OT receiver service 218 can randomly generate the remaining keys 121 using key generation algorithms. In some examples, the remaining keys 121 can be generated to not have a corresponding private key 127 and are included in the response request 106 to correspond to the remaining prompts 115.

At block 412, the OT receiver service 218 sends a response request 106 to the OT receiver service 218. For example, the OT receiver service 218 can initiate an oblivious transfer communication by sending the response request 106 to the OT sender service 212. In some examples, the response request 106 is transmitted to the OT sender service 212 via an API call or other form of request in compliance with the oblivious transfer protocol. The response request 106 can include the prompts 115 and corresponding keys 121.

At block 415, the OT receiver service 218 determines if the encrypted responses 124 have been received. If the encrypted responses 124 have been received via the OT protocol, the OT receiver service 218 proceeds to block 418. Otherwise, the OT receiver service 218 waits at block 415 for the encrypted responses 124 to be received.

At block 418, the OT receiver service 218 determines the response to the chosen prompt 115. In various examples, the OT receiver service 218 determines the response to the chosen prompt 115 by decrypting the encrypted response 124 to the chosen prompt 115. For example, the OT receiver service 218 can decrypt the encrypted response 124 associated with the chosen prompt 115 by using the private key 127 to the public key 121 used to encrypt the encrypted response 124. As each encrypted response 124 is encrypted using a different key 121 included in the response request 106, the OT receiver service 218 can only decrypt the encrypted response 124 that was encrypted using the public key 121 corresponding to the chosen prompt 115. Thereafter, this portion of the process proceeds to completion.

Figure 5:
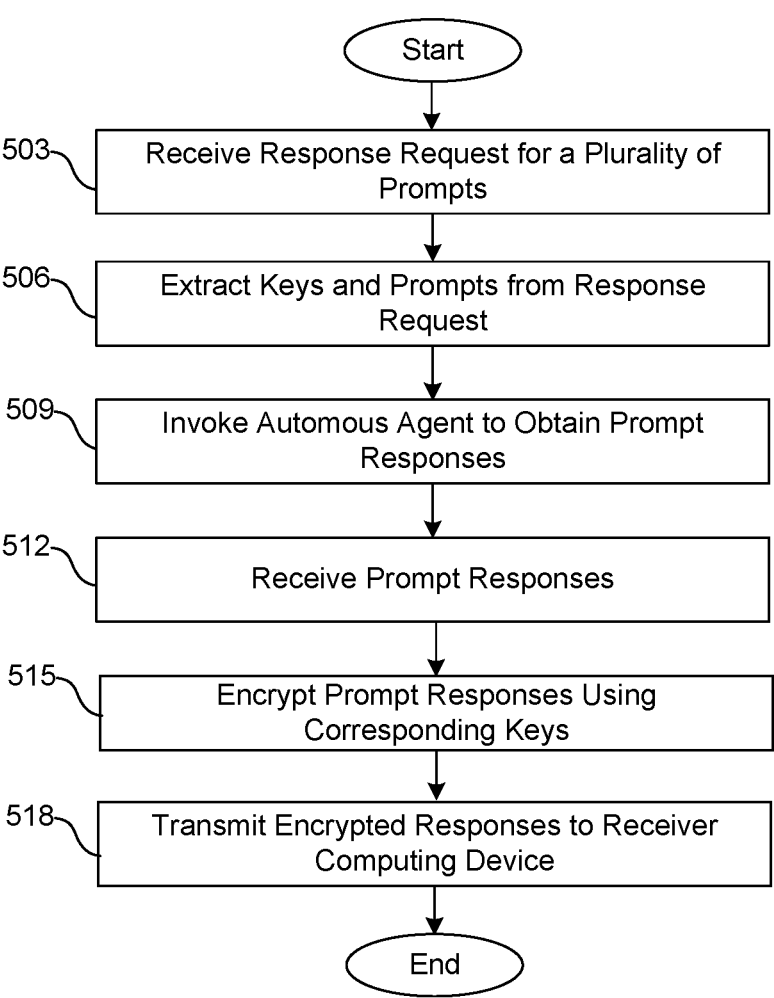
Figure 5:

Referring next to FIG. 5, shown is a flowchart that provides one example of the operation of a portion of the OT sender service 212. The flowchart of FIG. 5 provides merely an example of the many different types of functional arrangements that can be employed to implement the operation of the depicted portion of the OT sender service 212. As an alternative, the flowchart of FIG. 5 can be viewed as depicting an example of elements of a method implemented within the network environment 200.

Beginning with block 503, the OT sender service 212 receives a response request 106 from the OT receiver service 218. The OT sender service 212 can receive the response request 106 according to oblivious transfer. In various examples, the response request 106 includes multiple prompts 115 and corresponding keys 121. In various examples, the only one of the prompts 115 (e.g., the chosen prompt) corresponds to the information wanted by the receiver entity 103 or user.

At block 506, the OT sender service 212 extracts each of the prompts 115 and each of the corresponding keys 121 included in the response request 106. In various examples, the prompts 115 and corresponding keys 121 are included in the response request 106 in a format compatible with the OT protocol. As such, the OT sender service 212 can identity and extract the prompts 115 and corresponding keys 121 according to the format of the response request 106.

At block 509, the OT sender service 212 invokes an autonomous agent 215 to obtain the responses for each of the prompts 115. In some examples, the OT sender service 212 can provide the autonomous agent 215 with formatting rules 221, user data rules 224, and/or other types of rules that define how the prompt responses are to be provided and/or formatted. In various examples, the autonomous agent 215 can be invoked via an API call that includes the prompts 115, formatting rules 221, user data rules 224, and/or other appropriate data.

At block 512, the OT sender service 212 receives the prompt responses. In various example, the prompt responses are generated based at least in part on data included in a privacy database 112 and one or more outputs of an LLM 118. The prompt responses to each of the original prompts 115 from the response request 106 can be in a format that is compatible with the oblivious transfer protocol and as defined by the response formatting rules 221.

At block 515, the OT sender service 212 generates the encrypted responses 124 by encrypting the responses output from the LLM 118. For example, upon receiving the prompt responses to each of the prompts 115 from the autonomous agent 215, the OT sender service 212 can generate encrypted responses 124 by encrypting each of the prompt responses received using the corresponding key 121 included in the response request 106.

At block 518, the OT sender service 212 transmits the encrypted responses 124 to the OT receiver service 218. In various examples, the OT sender service 212 can transmit the encrypted responses 124 to the OT receiver service 218 in accordance with an oblivious transfer protocol. The OT sender service 212 remains unaware of which encrypted response 124 (and corresponding prompt 115) is of interest to the receiver entity 103 since the OT sender service 212 is not privy to which key 121 corresponds to the public key 121 associated with the private key 127 controlled by the receiver entity 103. Thereafter, this portion proceeds to completion.

Figure 6:
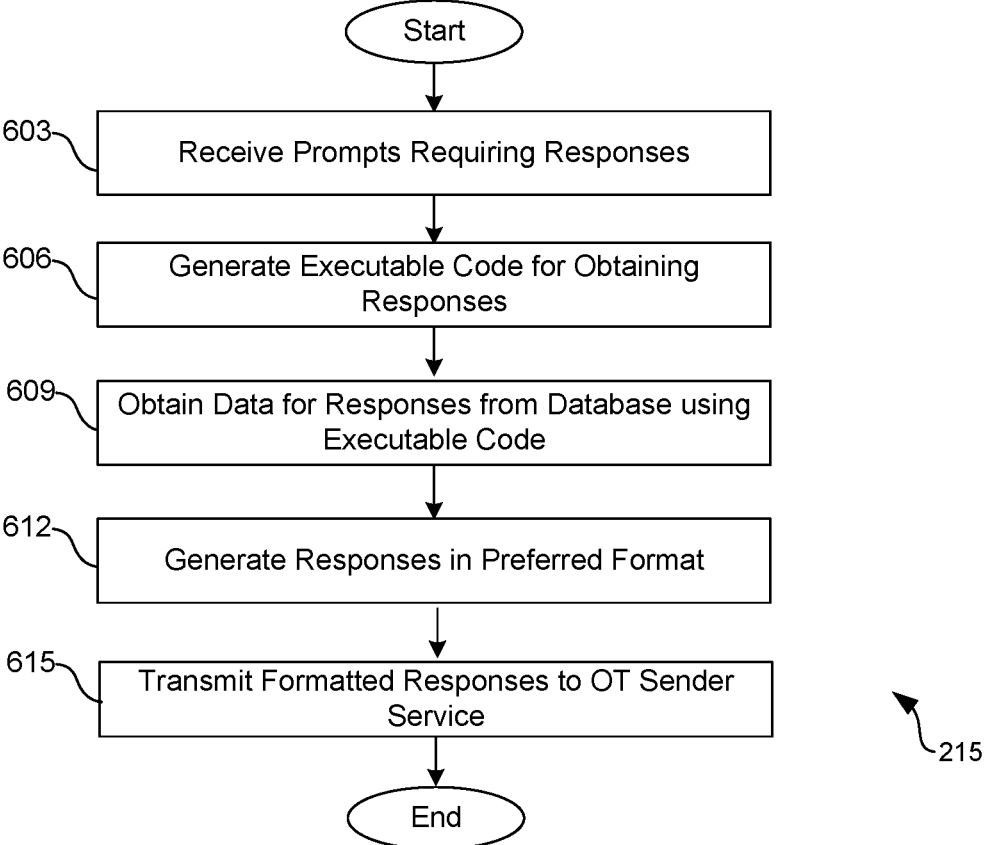

Referring next to FIG. 6, shown is a flowchart that provides one example of the operation of a portion of the autonomous agent 215. The flowchart of FIG. 6 provides merely an example of the many different types of functional arrangements that can be employed to implement the operation of the depicted portion of the autonomous agent 215. As an alternative, the flowchart of FIG. 6 can be viewed as depicting an example of elements of a method implemented within the network environment 200.

Beginning with block 603, the autonomous agent 215 receives prompts 115 requiring responses. For example, the autonomous agent 215 can receive a request from an OT sender service 212 for responses to a plurality of prompts 115. A prompt 115 can correspond to a query or text that can be used to request information from another system or service. In various examples, the prompt 115 can be in a natural language format and can be used as an input to a large language model 118 that is trained to output a response based at least in part on the prompt 115.

At block 606, the autonomous agent 215 generates executable code for obtaining the responses. In various examples, the format of the prompts 115 is not in a compatible format for accessing the information required to respond to the prompt 115 from a privacy database 112 or other database. In some examples, the autonomous agent 215 can execute an LLM 118 and submit the prompts 115 as inputs to a LLM 118 with a request to format each of the prompts 115 into a format that is compatible for accessing the required data from the privacy database 112 or other database. The output of the LLM 118 (e.g., the reformatted prompts 115) can include executable code that can be used to access the data in the privacy database 112. In various examples, the executable code can comprise structured query language (SQL), python, Java, PHP, and/or other type of executable code that can access data from the privacy database 112. For example, the autonomous agent 215, via the LLM 118, can convert each prompt 115 included in the response request 106 into executable code that is compatible with the privacy database 112.

At block 609, the autonomous agent 215 obtains data from the privacy database 112 using the executable code. In various examples, the autonomous agent 215 can execute the executable code that is output from the LLM 118 to obtain the data from the privacy database 112 to respond to the prompts 115 included in the response request 106.

At block 612, the autonomous agent 215 generates the responses to the prompts 115. For example, the autonomous agent 215 can execute the LLM 118 and apply the data obtained from the privacy database 112 as inputs to the LLM 118 along with response formatting rules 221 that define how to generate the responses to each of the prompts 115 based at least in part on the received data from the privacy database 112, user data rules 224, and/or other type of input that can be used to format.

At block 615, the autonomous agent 215 provides the responses to the OT sender service 212. In various examples, the output of the LLM 118 can correspond to responses to each of the original prompts 115 from the response request 106 in a format that is compatible with the oblivious transfer protocol and as defined by the response formatting rules 221. Thereafter, this portion of the process proceeds to completion.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203, 206.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A method, comprising:
   receiving a response request from a computing device, the response request comprising a plurality of prompts and a corresponding plurality of keys;
   reformatting the plurality of prompts into a plurality of reformatted prompts, individual ones of the plurality of reformatted prompts being in a format compatible with a database comprising data for responding to individual ones of the plurality of prompts;
   generating a plurality of responses to the response request using a large language model (LLM) and data retrieved from the database using the plurality of reformatted prompts;
   generating a plurality of encrypted responses by encrypting individual responses of the plurality of responses using a respective key of the corresponding plurality of keys; and
   transmitting the plurality of encrypted responses to the computing device.

2. The method of claim 1, wherein an exchange of the response request and the plurality of encrypted responses is based at least in part on an oblivious transfer (OT) protocol.

3. The method of claim 2, wherein one of the plurality of prompts comprises a chosen prompt associated with an OT receiver entity, and the chosen prompt is associated with a particular key of the corresponding plurality of keys, and the chosen prompt is encrypted using the particular key.

4. The method of claim 3, wherein the particular key is a public key of a key-pair, and a private key of the key-pair being controlled by the OT receiver entity.

5. The method of claim 2, wherein the OT protocol comprises a naor-pinkas protocol, OT extension protocol, OT with paillier cryptosystem protocol, or multiplicative homomorphic cryptosystem-based OT protocol.

6. The method of claim 1, wherein reformatting the plurality of prompts further comprises applying the plurality of prompts to the LLM, a first output of the LLM comprising executable code for obtaining the data from the database based at least in part on the plurality of prompts.

7. The method of claim 6, further comprising:
   executing the executable code to obtain the data from the database based at least in part on the plurality of prompts; and
   applying the data from the database and formatting parameters to the LLM, a second output of the LLM comprising the plurality of responses.

8. A system, comprising:
   a first computing device comprising a processor and a memory; and
   machine-readable instructions stored in the memory that, when executed by the processor, cause the first computing device to at least:
      receive a response request from a second computing device, the response request comprising a plurality of prompts and a corresponding plurality of keys;
      reformat the plurality of prompts into a plurality of reformatted prompts, individual ones of the plurality of reformatted prompts being in a format compatible with a database comprising data for responding to individual ones of the plurality of prompts;
      generate a plurality of responses to the response request using a large language model (LLM) and data retrieved from the database using the plurality of reformatted prompts;
      generate a plurality of encrypted responses by encrypting individual responses of the plurality of responses using a respective key of the corresponding plurality of keys; and
      transmit the plurality of encrypted responses to the second computing device.

9. The system of claim 8, wherein an exchange of the response request and the plurality of encrypted responses is based at least in part on an oblivious transfer (OT) protocol.

10. The system of claim 9, wherein one of the plurality of prompts comprises a chosen prompt associated with an OT receiver entity, and the chosen prompt is associated with a particular key of the corresponding plurality of keys, and the chosen prompt is encrypted using the particular key.

11. The system of claim 10, wherein the particular key is a public key of a key-pair, and a private key of the key-pair being controlled by the OT receiver entity.

12. The system of claim 9, wherein the OT protocol comprises a naor-pinkas protocol, OT extension protocol, OT with paillier cryptosystem protocol, or multiplicative homomorphic cryptosystem-based OT protocol.

13. The system of claim 8, wherein the machine-readable instructions further cause the first computing device to at least apply the plurality of prompts to the LLM, a first output of the LLM comprising executable code for obtaining the data from the database based at least in part on the plurality of prompts, the executable code corresponding to the plurality of reformatted prompts.

14. A non-transitory, computer-readable medium, comprising machine-readable instructions that, when executed by a processor of a first computing device, cause the first computing device to at least:

receive a response request from a second computing device, the response request comprising a plurality of prompts and a corresponding plurality of keys;

reformat the plurality of prompts into a plurality of reformatted prompts, individual ones of the plurality of reformatted prompts being in a format compatible with a database comprising data for responding to individual ones of the plurality of prompts;

generate a plurality of responses to the response request using a large language model (LLM) and data retrieved from the database using the plurality of reformatted prompts;

generate a plurality of encrypted responses by encrypting individual responses of the plurality of responses using a respective key of the corresponding plurality of keys; and transmit the plurality of encrypted responses to the second computing device.

15. The non-transitory, computer-readable medium of claim 14, wherein an exchange of the response request and the plurality of encrypted responses is based at least in part on an oblivious transfer (OT) protocol.

16. The non-transitory, computer-readable medium of claim 15, wherein one of the plurality of prompts comprises a chosen prompt associated with an OT receiver entity, and the chosen prompt is associated with a particular key of the corresponding plurality of keys, and the chosen prompt is encrypted using the particular key.

17. The non-transitory, computer-readable medium of claim 16, wherein the particular key is a public key of a key-pair, and a private key of the key-pair being controlled by the OT receiver entity.

18. The non-transitory, computer-readable medium of claim 15, wherein the OT protocol comprises a naor-pinkas protocol, OT extension protocol, OT with paillier cryptosystem protocol, or multiplicative homomorphic cryptosystem-based OT protocol.

19. The non-transitory, computer-readable medium of claim 14, wherein the machine-readable instructions, when executed by the processor, further cause the computing device to at least: apply the plurality of prompts to the LLM, a first output of the LLM comprising executable code for obtaining the data from the database based at least in part on the plurality of prompts, the executable code corresponding to the plurality of reformatted prompts.

\* \* \* \* \*